(12) United States Patent
Howes

(10) Patent No.: US 7,922,846 B2
(45) Date of Patent: Apr. 12, 2011

(54) METHODS OF MAKING AN INSULATED, IMPACT RESISTANT GLASS PRODUCT

(76) Inventor: Stephen E. Howes, Pompano Beach, FL (US)

( * ) Notice: Subject to any disclaimer, the term of this patent is extended or adjusted under 35 U.S.C. 154(b) by 103 days.

(21) Appl. No.: 12/112,290

(22) Filed: Apr. 30, 2008

(65) Prior Publication Data

US 2009/0272483 A1 Nov. 5, 2009

(51) Int. Cl.
*B32B 17/10* (2006.01)
(52) U.S. Cl. .......... 156/99; 156/105; 156/106; 156/107; 156/108; 156/109
(58) Field of Classification Search .............. 156/99, 156/105, 106, 107, 108, 109
See application file for complete search history.

(56) References Cited

U.S. PATENT DOCUMENTS

| | | | |
|---|---|---|---|
| 2,369,382 A | 2/1945 | Watkins | |
| 4,234,533 A | 11/1980 | Langlands | |
| 4,264,681 A | 4/1981 | Girard et al. | |
| 4,756,938 A | 7/1988 | Hickman | |
| 5,178,933 A | 1/1993 | Yoshida et al. | |
| 5,268,049 A * | 12/1993 | Marriott et al. ................ | 156/99 |
| 5,391,411 A | 2/1995 | Rowland et al. | |
| 5,547,720 A | 8/1996 | Rittler | |
| 5,853,828 A * | 12/1998 | Schimmelpenningh et al. ............... | 428/34 |
| 5,937,611 A * | 8/1999 | Howes ...................... | 52/745.15 |
| 6,709,750 B1 | 3/2004 | Pohlmann et al. | |
| 7,204,901 B2 | 4/2007 | Bayha et al. | |
| 7,258,757 B2 | 8/2007 | Huang et al. | |
| 2005/0126091 A1* | 6/2005 | Sherrett et al. ............... | 52/204.6 |
| 2007/0272343 A1 | 11/2007 | Meyer et al. | |

\* cited by examiner

*Primary Examiner* — Kat Wyrozebski
*Assistant Examiner* — Joshel Rivera
(74) *Attorney, Agent, or Firm* — Wood, Herron & Evans, L.L.P.

(57) ABSTRACT

A method of making an insulated, impact resistant glass product from first and second sheets of glass. The first sheet of glass includes a major surface with a perimeter surface portion surrounding a central surface portion. The method comprises applying a raised barrier to the perimeter surface portion to produce a dam of a predetermined height surrounding the central surface portion. A curable fluid material is dispensed over the central surface portion and the curable fluid material spreads outward from the central surface portion to the raised barrier. The second sheet of glass is attached to the raised barrier leaving a gap between a major surface of the second sheet of glass and the cured fluid material.

18 Claims, 6 Drawing Sheets

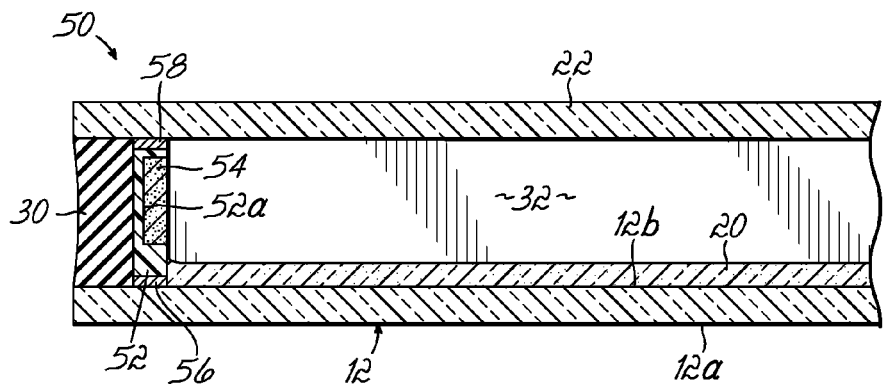
FIG. 6
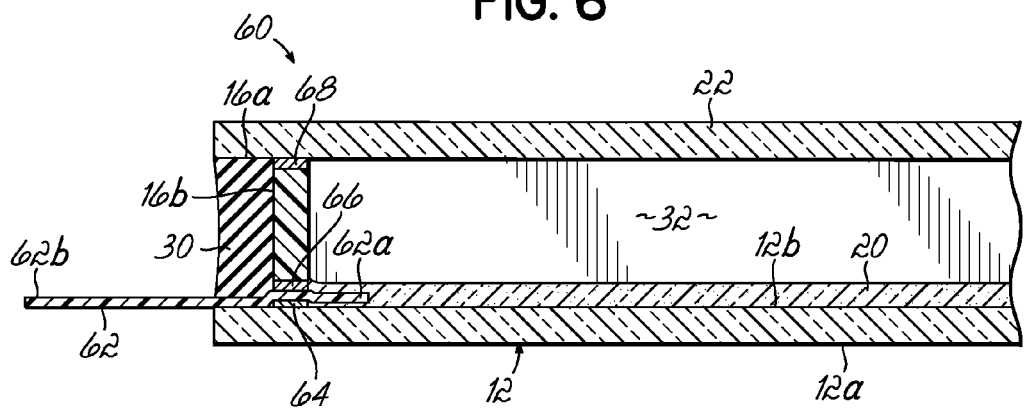
FIG. 7
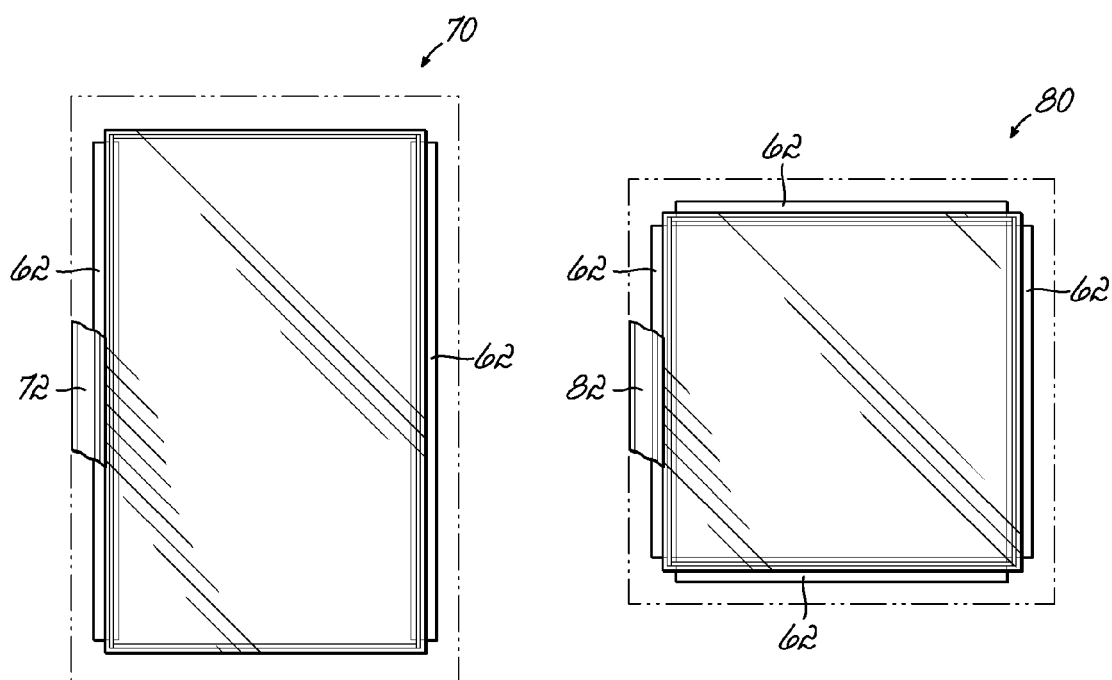
FIG. 8
FIG. 9

US 7,922,846 B2

METHODS OF MAKING AN INSULATED, IMPACT RESISTANT GLASS PRODUCT

TECHNICAL FIELD

The present invention relates generally to the construction of insulated glass products with impact resistance.

BACKGROUND

Impact resistant glass, such as for windows, is desirable in many locations and situations. One application is in buildings or houses located in geographic regions that are highly susceptible to strong adverse weather conditions, such as hurricanes, involving extremely high winds. In such conditions, high winds can hurl large projectiles or debris into windows. Also, the high winds themselves can create large pressure differentials between the inside and outside of the building or house. These pressure differentials can easily blow out or otherwise damage the windows of the house or building. Various window products have been proposed and implemented in the area of impact resistant windows. Still, it remains a challenge to construct an impact resistant insulated glass product and, therefore, improvements in this area would be desirable.

SUMMARY

Generally, the invention involves methods of making insulated, impact resistant glass products. In one general method, a raised barrier is applied to a perimeter surface portion of a first sheet of glass to produce a dam surrounding a central surface portion of the first sheet of glass. A curable fluid material, such as a polyurethane resin or other curable polymer, is then dispensed over the central surface portion. The curable fluid material is spread out, either with or without assistance, to entirely cover the central surface portion outwardly to the raised barrier. A second sheet of glass is then secured in spaced relation to the first sheet of glass leaving a gap between a major surface of the second sheet of glass and the fluid material. If practical, this step is done quickly before the fluid cures to prevent airborne dust or other contaminants from falling onto the fluid. The cured material will provide impact resistance, with the level of resistance being at least in part based on the properties of the material and the applied thickness.

The raised barrier may further comprise a spacer element having an adhesive surface facing away from the major surface of the first sheet of glass. Securing the second sheet of glass may further comprise peeling away a liner from the adhesive surface and then adhering the second sheet of glass to the adhesive surface. Either one or both of the sheets of glass may be annealed, heat strengthened or tempered. Of course, the invention is not limited to insulated glass structures having only two sheets of glass as other insulated structures may be created, for example, with more than two sheets of glass.

The resin or other curable fluid may be dispensed and spread out while the first sheet of glass is maintained in at least a substantially horizontal orientation. This may be accomplished using an air floatation table or surface. Adhering the second sheet of glass to the barrier may also be performed while the first and second sheets of glass are maintained in at least substantially horizontal orientations. The barrier may further comprise an element with a desiccant that serves to remove moisture from a space defined by the gap between the major surface of the second sheet of glass and the cured fluid material. The method may then comprise applying a sealant, such as a hot melt adhesive, to the barrier to seal the space in at least a substantially airtight manner.

In other aspects of the invention, one or more reinforcing, flexible film layers, such as a PET film, may be applied and secured to the first sheet of glass and then suitably affixed to a support structure to provide even further impact resistance. The support structure may, for example, be a window or door frame, or other support structure.

Various additional advantages and features of the invention will become readily apparent to those of ordinary skill in the art upon review of the following detailed description of the illustrative embodiments taken in conjunction with the accompanying drawings.

BRIEF DESCRIPTION OF THE DRAWINGS

FIG. 6 is a cross sectional view similar to FIG. 5A, but illustrating an alternative embodiment in which the dam is a spacer that includes a recess or space filled with a desiccant.

FIG. 7 is a cross sectional view similar to FIG. 5A, but illustrating another alternative embodiment incorporating a reinforcement film or sheet extending outward from a periphery of the insulated, impact resistant glass product.

FIG. 8 is an elevational view illustrating the insulated, impact resistant glass product in a frame or support structure and having reinforcement films or sheets extending along only two opposite edges of the glass product.

FIG. 9 is an elevational view similar to FIG. 8, but illustrating a glass product having reinforcement film extending along all peripheral sides of the glass product.

DETAILED DESCRIPTION OF ILLUSTRATIVE EMBODIMENTS

Figure 1:
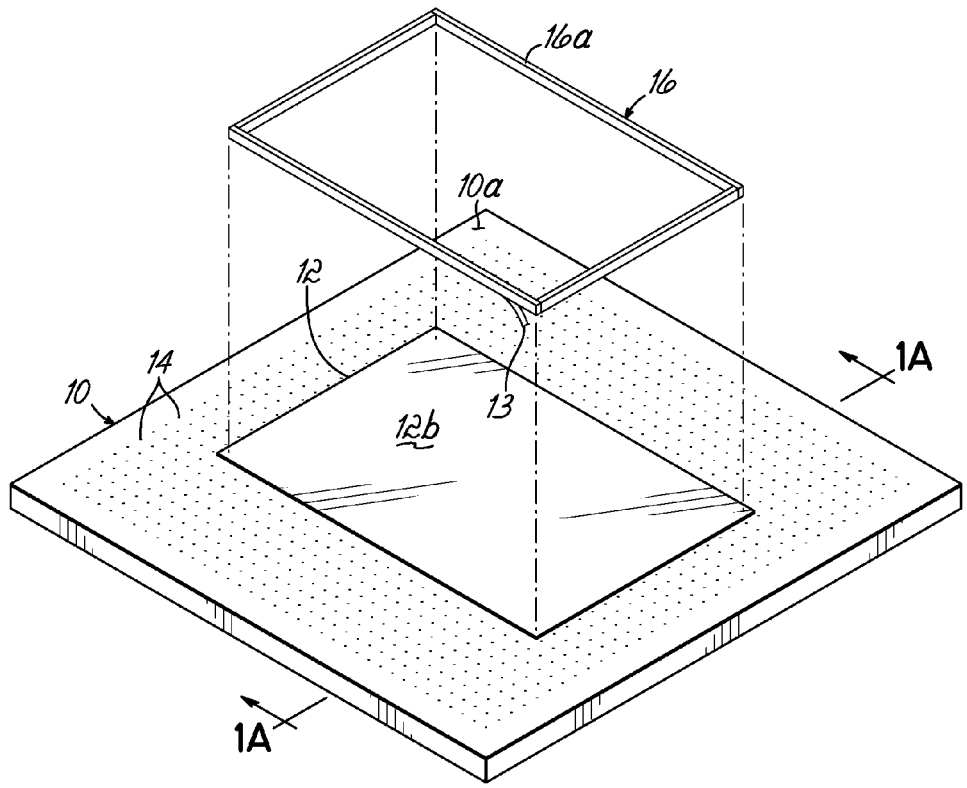
FIG. 1 is a perspective view illustrating a first sheet of glass on an air flotation table and a barrier or dam illustrated, schematically, being placed on the first sheet of glass.
Figure 1A:
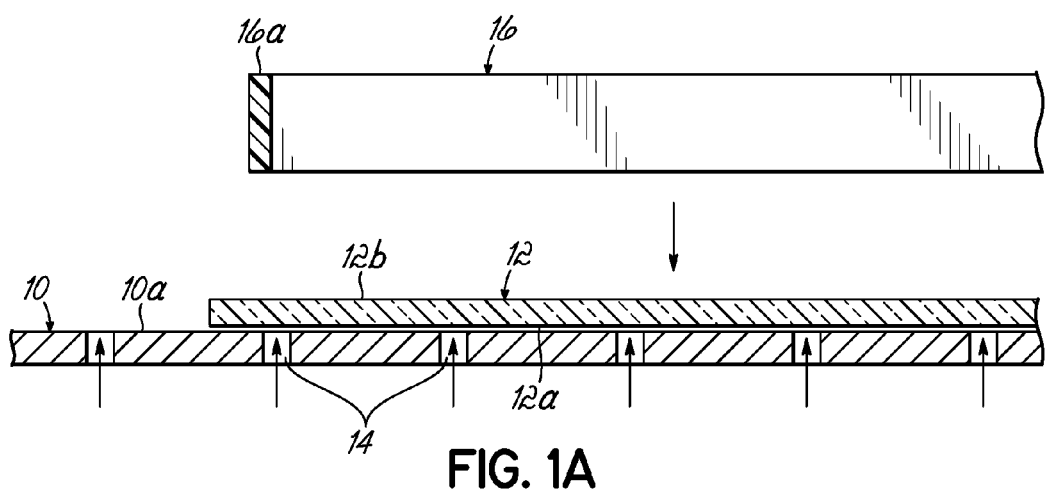
FIG. 1A is a cross sectional view taken generally along line 1A-1A of FIG. 1 and illustrating the barrier or dam being applied to the first sheet of glass.

FIGS. 1 and 1A illustrate a conventional air flotation table or surface 10, in a schematic fashion, that receives a first sheet of glass 12. The use of an air flotation table 10 creates a small air space between the upper surface 10a of the table 10 and the lower surface 12a of the first sheet of glass 12. This ensures that the first sheet of glass 12 remains perfectly horizontal during the fabrication process or method to be described below. It will be appreciated that the air passages 14 shown in FIG. 1A are of exaggerated dimension for illustrative purposes only. The first step in the method is to form a raised dam or barrier from a spacer 16 generally around a perimeter portion of the first sheet of glass 12. It will be appreciated that spacer 16 may be preformed into a unitary structure from several pieces. In this example, four pieces are used, as shown. This spacer 16 may be formed with any desired height, although ¼" to 1" should be appropriate for many applications. The spacer 16 may be formed in any conventional manner, from rigid materials such as aluminum, or other synthetic or natural materials. A suitable spacer may be obtained from Glasslam N.G.I., Inc. of Pompano Beach, Fla., the assignee of the present invention, under the name Air-Tight. As is also known, the spacer 16 may be impregnated with or otherwise contain a desiccant material, as will be described below. The spacer 16 is suitably adhered to the upper surface 12b of the first sheet of glass 12, such as by using a conventional adhesive or tape. A peel away liner 13 may be used to cover a tacky adhesive surface until it is needed.

Figure 2:
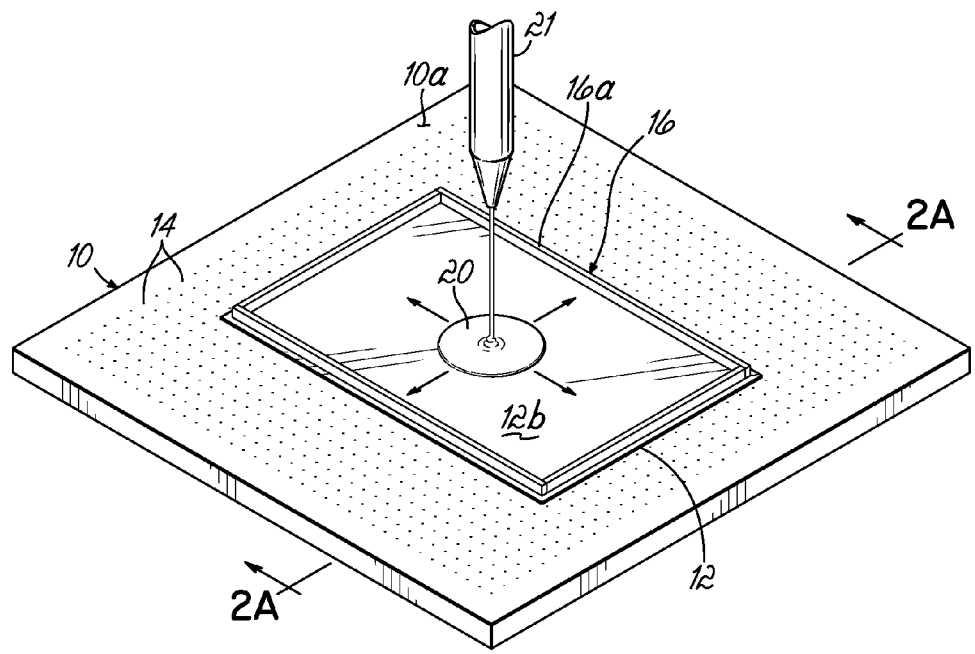
FIG. 2 is a perspective view similar to FIG. 1, but illustrating the dam or barrier in place and schematically illustrating curable fluid material being dispensed onto the first sheet of glass.
Figure 2A:
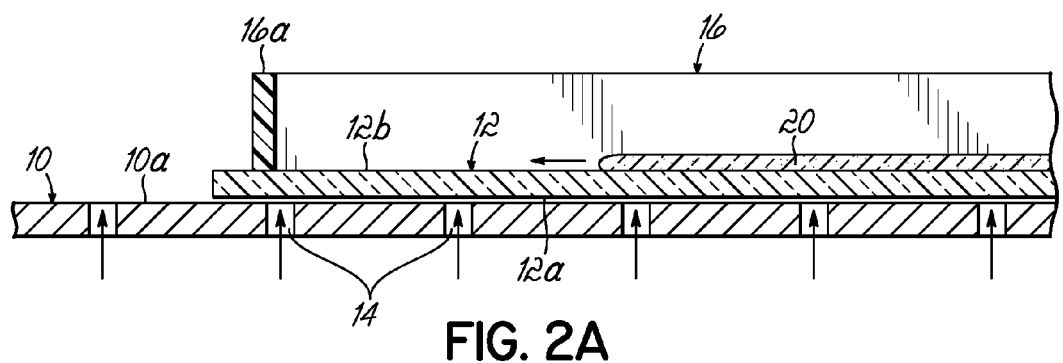
FIG. 2A is a cross sectional view taken generally along line 2A-2A of FIG. 2 and schematically illustrating the fluid material spreading outwardly toward the barrier or dam.

In FIGS. 2 and 2A, the spacer 16 has been affixed to the upper surface 12b of the first sheet of glass 12 to form a raised dam generally around the perimeter of the first sheet of glass 12 and a curable resin 20 is being dispensed onto a central area of the upper surface 12b with any suitable dispenser 21 such that the resin 20 expands or spreads outward in a radial direction. It will be appreciated that at least the upper surface 12b is washed and dried prior to dispensing the resin 20. Preferably, all glass used in this method is washed and dried before use. The resin 20 is of such a low viscosity that no manual spreading or other assistance is needed. Because the first sheet of glass 12 is perfectly horizontal, the resin 20 will uniformly spread out with an even thickness over the entire surface area 12b defined within the dam formed by the spacer 16. The resin 20 may be transparent, opaque or colored and, as known for resins used in the laminated glass industry, for example, may have any conventional additives depending on application needs. The uniform thickness of the resin, for example, may be from about 0.06 mil to about 2 mils. The necessary amount to be dispensed to create the desired thickness may be easily calculated in accordance with the surface area to be coated. The resin 20 may be a polyurethane based resin, such as a resin sold under the trademark PolyLam™, available from Glasslam N.G.I., Inc. Other resins formed from one or more components may be used instead.

Figure 3:
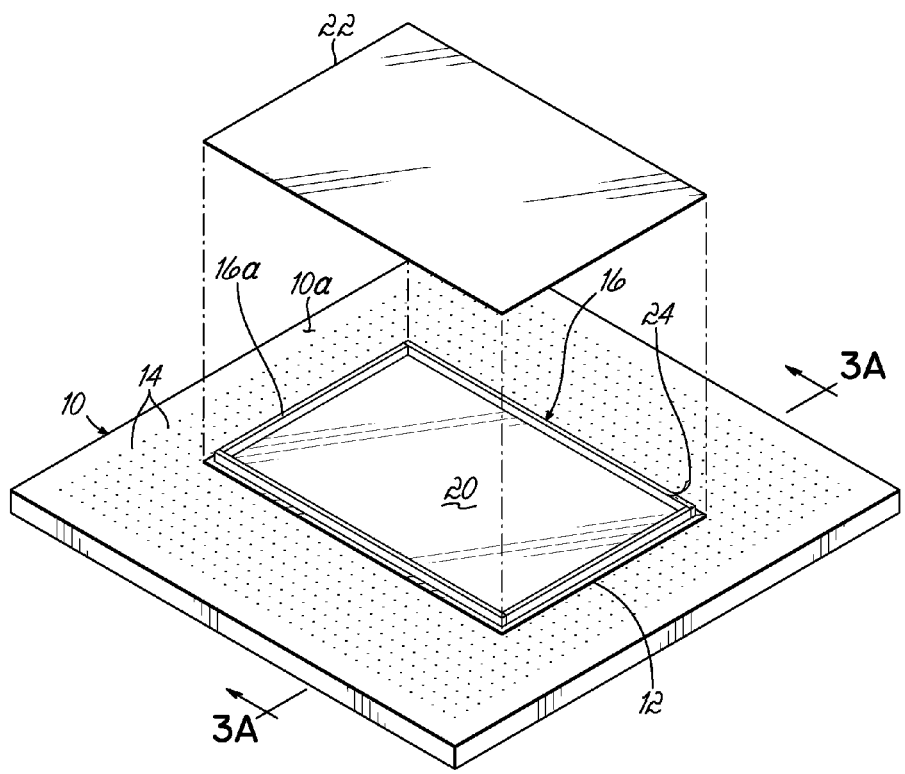
FIG. 3 is a perspective view similar to FIG. 1 and FIG. 2, but illustrating the placement of a second sheet of glass onto the upper edges of the barrier or dam.
Figure 3A:
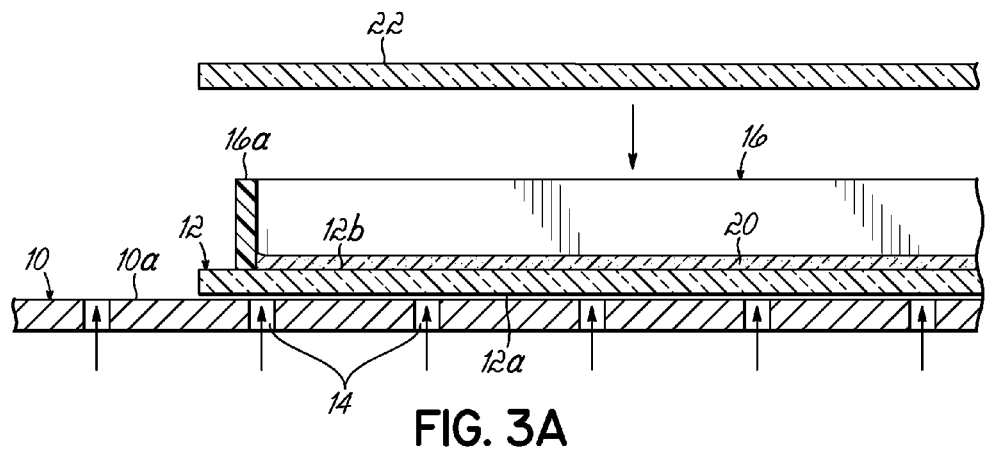
FIG. 3A is a cross sectional view taken generally along line 3A-3A of FIG. 3 and illustrating the placement of the second sheet of glass downward onto the upper edges of the barrier or dam.

As shown in FIGS. 3 and 3A, a second sheet of glass 22 is adhered to the top of the spacer or dam 16 after the resin 20 has been dispensed onto the upper surface 12b of the first sheet of glass 12. As with the first glass sheet 12, this adherence may be accomplished with suitable adhesive or tape. Preferably, the first and second sheets 12, 22 are of the same thickness, e.g., 1/16" to ½". The second sheet of glass 22 may be adhesively secured to the upper edges or surfaces 16a of the spacer 16 such as by exposing an upper adhesive surface after peeling away a liner 24 on the upper surfaces 16a of the spacer 16. The resin 20 is then allowed to fully cure. For speeding the curing process, the air flotation table 10 may supply heat to the first sheet of glass 12, such as by discharging heated air through the air passages or orifices 14 of the table 10.

Figure 4:
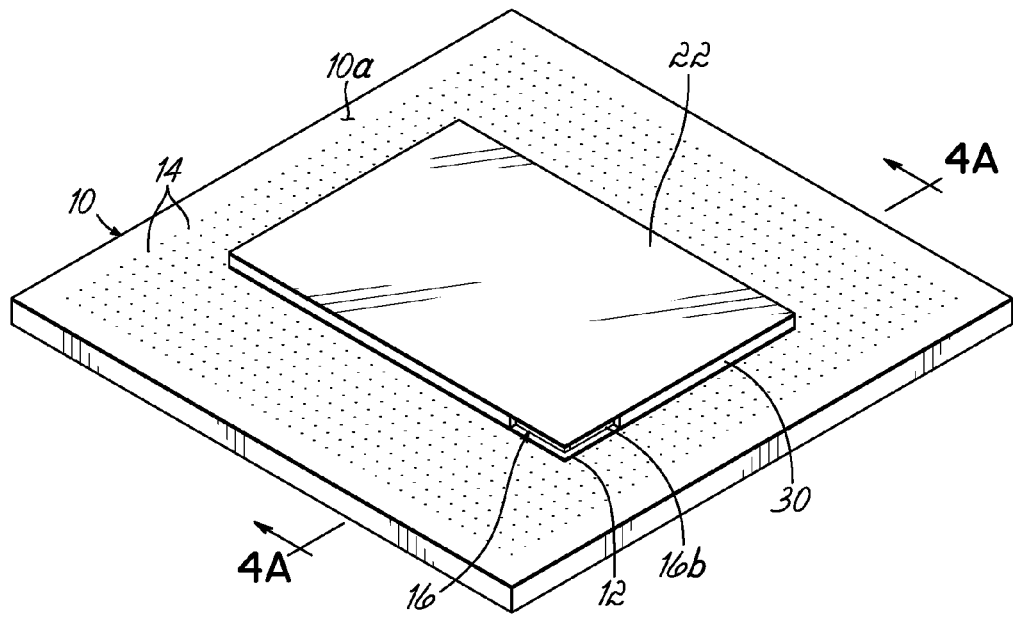
FIG. 4 is a perspective view similar to FIGS. 1-3, but illustrating sealant being applied to the peripheral or outer surfaces of the barrier or dam.
Figure 4A:
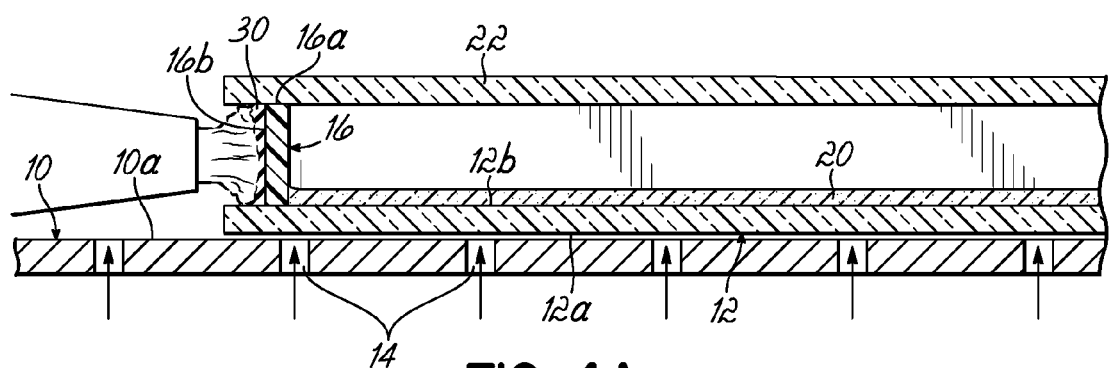
FIG. 4A is a cross sectional view taken generally along line 4A-4A of FIG. 4 further illustrating the application of a sealant to the outer surface of the barrier or dam.

As shown in FIGS. 4 and 4A, after the resin 20 cures a sealant 30 is applied to the outer peripheral surface 16b of the spacer 16 to fully seal the gap or air space 32 between the cured resin layer 20 and the second sheet of glass 22. This gap may be, for example, 5/16" in height and may be filled with an inert gas, as is known. This sealant 30 may be a hot melt adhesive, such as No. 5192G (Butyl), No. 9190 (Curative), or No. 3190 (Polyurethane), from Bostik in Middleton, Mass. Other possible sealants may be obtained from H.B. Fuller, such as a polyurethane (5100 series).

Figure 5:
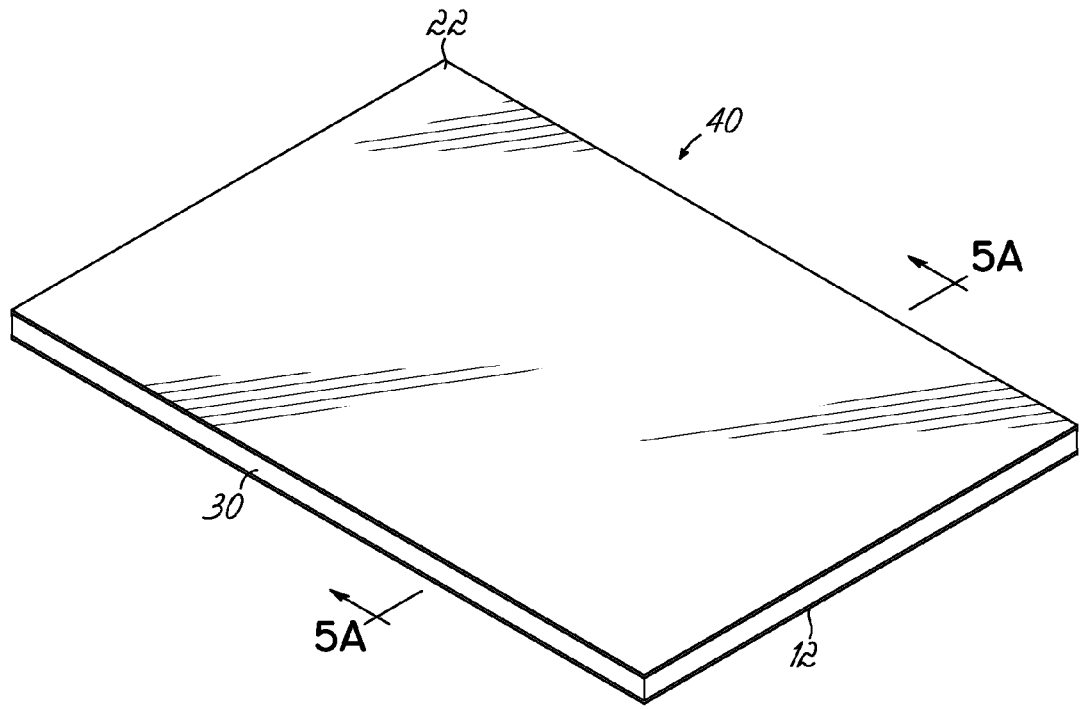
FIG. 5 is a perspective view of the insulated, impact resistant glass product.
Figure 5A:
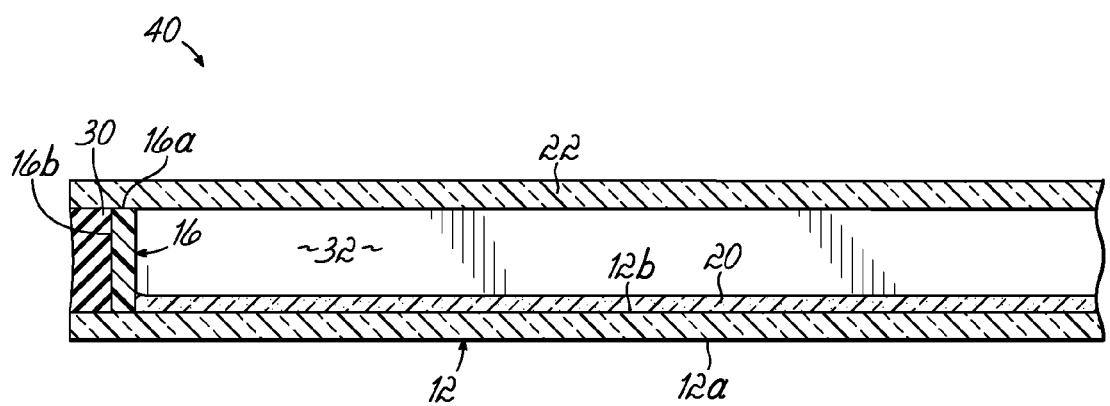
FIG. 5A is a cross sectional view taken generally along line 5A-5A of FIG. 5.

After the sealant 30 has cured, the glass product 40 takes the form generally as shown in FIGS. 5 and 5A. It will be appreciated that many other configurations are possible within the concepts disclosed herein, a few of which are described below with like reference numerals referring to like elements of the previously described embodiment.

FIG. 6 illustrates a cross sectional view similar to FIG. 5A, but illustrating a glass product 50 with a spacer 52 forming a raised dam and including a suitable recess or space 52a receiving a desiccant 54. The spacer 52 is shown with pieces of two sided adhesive tape 56, 58 respectively adhering it to glass sheets 12, 22. It will be appreciated that the previously described embodiments may utilize such tape in a similar manner. As is known in the art, desiccants are used to remove moisture from the air within the space 32 between the second glass sheet 22 and the resin layer 20 shown in FIG. 6.

FIG. 7 illustrates another embodiment of a glass product 60 in cross section. In this regard, a reinforcement film or sheet 62 is used to further provide impact resistance. The film or sheet 62 is a strip of material, such as PET, that is initially adhered to first glass sheet 12 by using two-sided tape 64 which is about 0.040" thick. The film or sheet 62 is further adhered to the first glass sheet 12 by having a free inner end 62a in contact with the resin 20 such as shown with uncured resin 20 flowing above and below inner end 62a for added securement after subsequent curing of the resin 20. The spacer 16b is adhered to the top of the sheet or film 62 using two-sided adhesive tape 66 and is adhered to the second glass sheet 22 with two-sided adhesive tape 68 as in previously described embodiments. An outer end 62b extends outwardly from the periphery of the first glass sheet 12 for suitable chemical and/or mechanical fixation to a support structure, such as a window or doorframe for example, as discussed generally in U.S. Pat. Nos. 5,778,629; 5,937,611; and 6,101,783, the disclosures of which are hereby incorporated by reference herein. As shown in FIGS. 8 and 9, such reinforcement films or sheets 62 may be used on opposite edges of the glass product 70 (FIG. 8), as would be especially useful for long narrow window products, such as glass lites, or may be used along all sides of the glass product 80 (FIG. 9), as would be useful for larger windows. In each case, the film or sheet 62 at the periphery may be secured to any suitable structural member, such as a window frame 72, 82, doorframe or other structure. In the examples shown, the PET film may have a width of about 1" to about 3" and extend along at least a majority of the associated side of the glass product 70, 80.

While the present invention has been illustrated by a description of various embodiments and while these embodiments have been described in some detail, it is not the intention of the Applicant to restrict or in any way limit the scope of the appended claims to such detail. Additional advantages and modifications will readily appear to those skilled in the art. The various features of the invention may be used alone or in any combination depending on the needs and preferences of the user. This has been a description of the present invention, along with the preferred methods of practicing the present invention as currently known. However, the invention itself should only be defined by the appended claims.

What is claimed is:

1. A method of making an insulated, impact resistant glass product from first and second sheets of glass, the first sheet of glass having an upper surface with a perimeter surface portion surrounding a central surface portion, the method comprising:
    applying a raised barrier to the perimeter surface portion to produce a dam of a predetermined height surrounding the central surface portion;
    dispensing a curable fluid material downwardly at a dispensing point located over the central surface portion and into contact with the central surface portion of the upper surface;
    spreading the curable fluid material radially outwardly from the dispensing point to entirely cover the central surface portion and extending further outwardly to cover the entire upper surface defined by the raised barrier; and
    after dispensing the curable fluid material, securing the second sheet of glass in spaced relation to the first sheet of glass leaving a gap between an opposing surface of the second sheet of glass and the curable fluid material.

2. The method of claim 1, wherein the raised barrier further comprises a spacer element having an adhesive surface facing away from the upper surface of the first sheet of glass, and securing the second sheet of glass further comprises:
    peeling away a liner from the adhesive surface; and
    adhering the second sheet of glass to the adhesive surface.

3. The method of claim 1, wherein the curable fluid material comprises a resin.

4. The method of claim 1, wherein at least one of the first or second sheets of glass is annealed.

5. The method of claim 1, wherein at least one of the first or second sheets of glass is heat strengthened.

6. The method of claim 1, wherein at least one of the first or second sheets of glass is tempered.

7. The method of claim 1, wherein the steps of dispensing and spreading the curable fluid material are performed with the first sheet of glass maintained in at least a substantially horizontal orientation.

8. The method of claim 1, wherein the step of adhering the second sheet of glass is performed with the first and second sheets of glass maintained in at least substantially horizontal orientations.

9. The method of claim 1, wherein the barrier further comprises a spacer element with a desiccant for removing moisture from a space defined by the gap, and the method further comprises:
    applying a sealant to the barrier to seal the space in at least a substantially airtight manner.

10. A method of making an insulated, impact resistant glass product from first and second sheets of glass, the first sheet of glass having an upper surface with a perimeter surface portion surrounding a central surface portion, the method comprising:
    applying a reinforcing, flexible film layer at least to the perimeter surface portion of the upper surface of the first sheet of glass;
    applying a raised barrier to the reinforcing, flexible film layer and over the perimeter surface portion to produce a dam of a predetermined height surrounding the central surface portion;
    dispensing a curable fluid material downwardly at a dispensing point located over the central surface portion;
    spreading the curable fluid material radially outwardly from the dispensing point to entirely cover the central surface portion and extending further outwardly to cover the entire upper surface defined by the raised barrier such that the fluid material contacts the film layer applied at least to the perimeter surface portion;
    after dispensing the curable fluid material, securing the second sheet of glass in spaced relation to the first sheet of glass leaving a gap between a second surface of the second sheet of glass and the curable fluid material; and
    securing a perimeter portion of the reinforcing, flexible film layer to a support structure.

11. The method of claim 10, wherein the raised barrier further comprises a spacer element having an adhesive surface facing away from the surface of the first sheet of glass, and securing the second sheet of glass further comprises:
    peeling away a liner from the adhesive surface; and
    adhering the second sheet of glass to the adhesive surface.

12. The method of claim 10, wherein the curable fluid material comprises a resin.

13. The method of claim 10, wherein at least one of the first or second sheets of glass is annealed.

14. The method of claim 10, wherein at least one of the first or second sheets of glass is heat strengthened.

15. The method of claim 10, wherein at least one of the first or second sheets of glass is tempered.

16. The method of claim 10, wherein the steps of dispensing and spreading the curable fluid material are performed with the first sheet of glass maintained in at least a substantially horizontal orientation.

17. The method of claim 10, wherein the step of adhering the second sheet of glass is performed with the first and second sheets of glass maintained in at least substantially horizontal orientations.

18. The method of claim 10, wherein the barrier further comprises a spacer element with a desiccant for removing moisture from a space defined by the gap, and the method further comprises:
    applying a sealant to the barrier to seal the space in at least a substantially airtight manner.

* * * * *